(12) United States Patent (10) Patent No.: US 7,735,642 B2
Castritis (45) Date of Patent: Jun. 15, 2010

(54) THREE PIECE SNAP FIT EJECTABLE DISC CASE

(76) Inventor: Tryfon D. Castritis, 270 N. Canon Dr., Suite 1966, Beverly Hills, CA (US) 90210

( * ) Notice: Subject to any disclaimer, the term of this patent is extended or adjusted under 35 U.S.C. 154(b) by 0 days.

(21) Appl. No.: 10/903,763

(22) Filed: Jul. 31, 2004

(65) Prior Publication Data

US 2006/0021884 A1 Feb. 2, 2006

(51) Int. Cl.
*B65D 85/30* (2006.01)
*A47B 81/00* (2006.01)
(52) U.S. Cl. ............. 206/308.1; 206/309; 206/313; 312/9.19; 312/9.21; 312/9.41
(58) Field of Classification Search .......... 206/307, 206/308.1, 309–313; 312/9.21, 9.27, 9.41, 312/9.19
See application file for complete search history.

(56) References Cited

U.S. PATENT DOCUMENTS

| | | | | |
|---|---|---|---|---|
| 5,011,010 A | * | 4/1991 | Francis et al. | 206/307 |
| 5,265,721 A | * | 11/1993 | Castritis | 206/308.1 |
| 5,450,953 A | * | 9/1995 | Reisman | 206/310 |
| 5,495,939 A | * | 3/1996 | Castritis | 206/307 |
| 5,593,031 A | * | 1/1997 | Uchida | 206/308.1 |
| 5,662,216 A | * | 9/1997 | Nesbitt et al. | 206/308.1 |
| 5,676,246 A | * | 10/1997 | Gloger | 206/308.1 |
| 5,695,053 A | * | 12/1997 | Koh et al. | 206/308.1 |
| 5,944,180 A | * | 8/1999 | Koh et al. | 206/308.1 |
| 6,964,335 B1 | * | 11/2005 | Harris | 206/308.1 |
| 7,178,885 B2 | * | 2/2007 | Berkson et al. | 312/9.11 |

\* cited by examiner

*Primary Examiner*—Jila M. Mohandesi

(57) ABSTRACT

An ejectable disc case is made up of three pieces—a bottom piece, a top piece, and a movable tray, all of which can be formed by injection molding and then assembled together by snap fit. The bottom has a hole through which a disc can be ejected and two bottom grooves engaged by groove mechanisms of the tray. The tray has a disc perimeter support for supporting a perimeter of the disc in the tray in the retracted position, a disc locking mechanism for holding the perimeter of the disc in the tray in the retracted position, a center disc rest connected to the disc perimeter support by a center disc rest slant ramp, and a hook with a hook prong that extends upwardly from the center disc rest. The hook prong moves upwardly through the disc hole and engages the disc center to secure the disc center when the tray moves from the extended position to the retracted position but disengages the disc and moves downwardly through the disc hole when the tray moves from the retracted position to the extended position. The bottom side wall through which the disc is ejected has one or more downwardly sloping ramps to actuate disengagement of the disc from the hook prong as the tray moves from the retracted position to the extended position. The tray can have multiple tray holes within the disc perimeter support to decrease the amount of material required for construction of the tray.

22 Claims, 6 Drawing Sheets

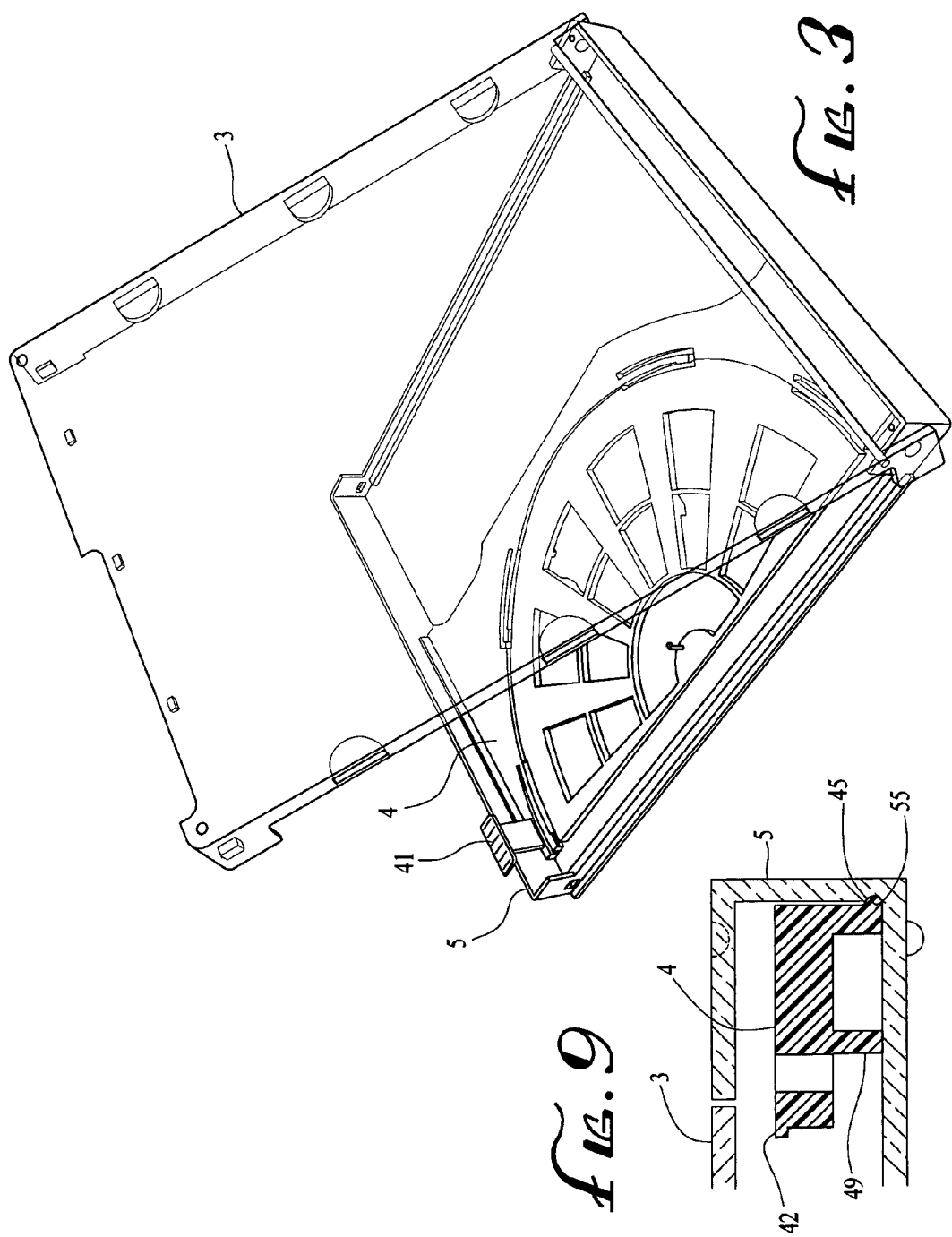

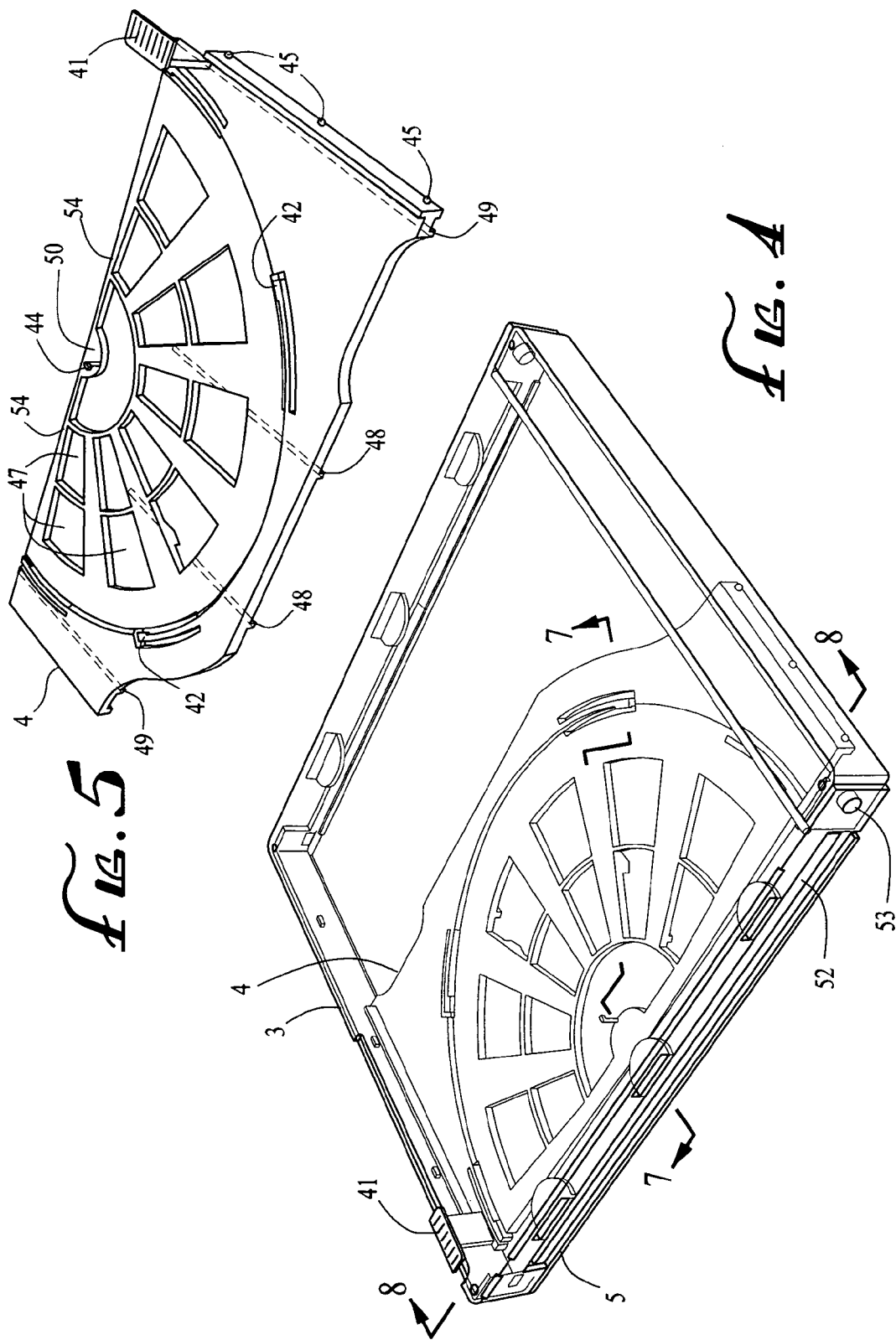

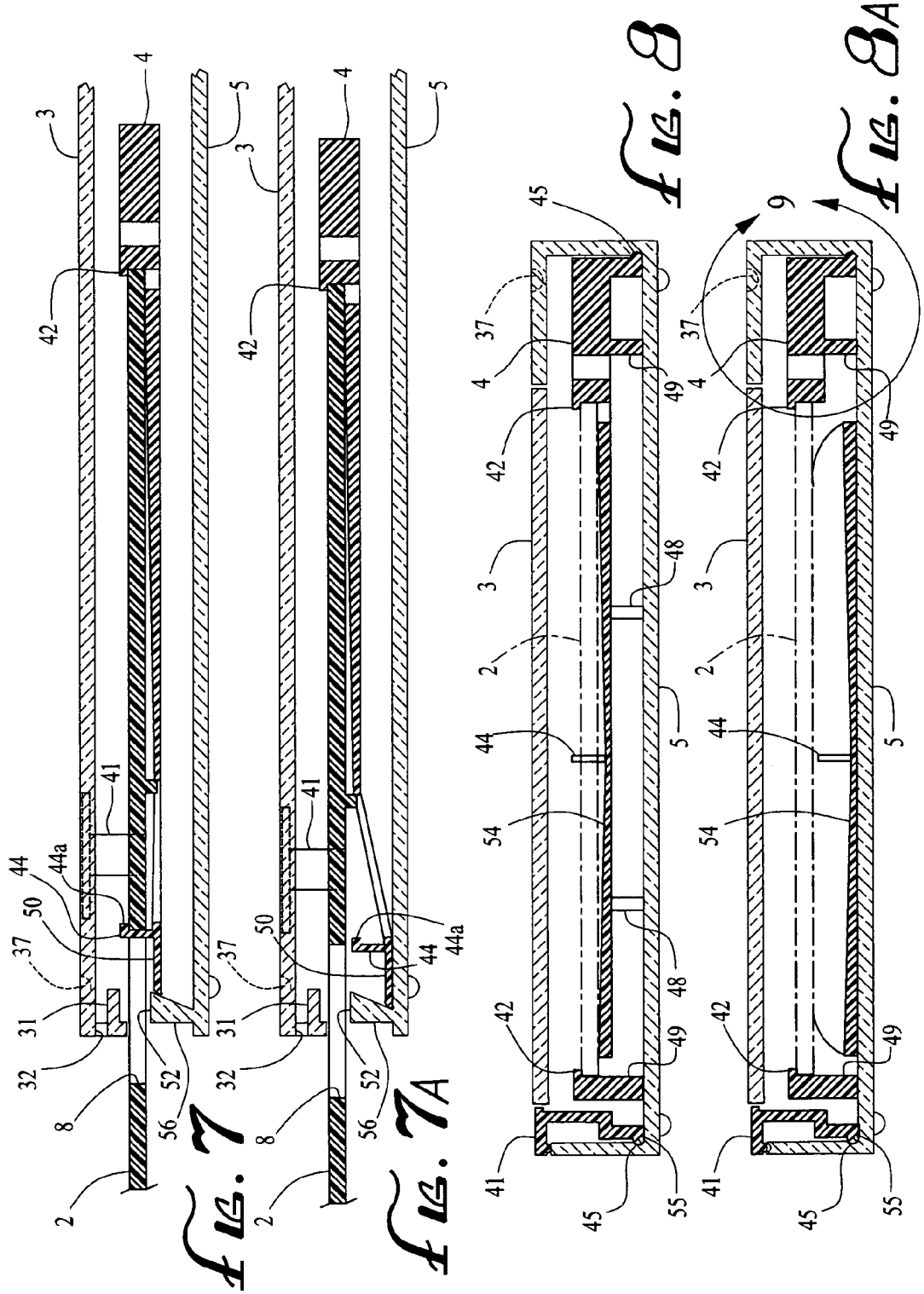

THREE PIECE SNAP FIT EJECTABLE DISC CASE

CROSS-REFERENCE TO RELATED APPLICATIONS

The present application is related to a design patent application Ser. No. 29/210,460 which is specifically incorporated herein by reference and which is being filed concurrently with the present application on the same date: entitled "Ejectable Disc Case."

FIELD OF THE INVENTION

The present invention is in the field of cases for individual CD, DVD or other discs, and more particularly to a case in which the disc is ejectable from the case.

BACKGROUND OF THE INVENTION

Today consumers purchase and use billions of discs each year. CD discs are a common medium of storage of music and DVDs are becoming, more and more, the common medium of storage of movies and other audio-visual works. In addition, various forms of optical memory discs have become a common storage medium for data, of all sorts, in today's world in which personal computers are so widely prevalent that they now appear in grade schools and talk of hundreds of millions of personal computers is commonplace. The common thread for each of these discs is that they have a disc hole in a disc center so that whatever device is using the disc can spin the disc and retrieve data from the spinning disc.

In the past, CD discs replaced other methods of storage as the most popular medium for music. However, despite the enormous popularity of musical CDs, the cases in which CDs were packaged were limited.

Because of a long felt need for improved CD cases, and especially for CD cases in which the disc can easily be ejected, numerous inventors, including the present inventor, endeavored to come up with improved CD cases that would meet the demands of consumers. See, e.g., U.S. Pat. Nos. 5,265,721 and 5,495,939. However, despite much effort, and despite many different inventions, the market still lacks an economical CD case from which a CD can be ejected. At least part of the explanation for the failure of the market to embrace such inventions has been manufacturability and cost.

As the need for an economical, ejectable CD case went unfulfilled, a new market for DVD discs roared into existence. DVDs have now become enormously popular as a storage medium for movies and sales of movies on DVDs has increased faster than even many within the industry predicted. The result is a vast consumer market for DVDs. Yet, despite the size of this market, DVD cases remain bulky and not always easy to use. Like CD cases, there is a crying need for improvement that has gone unfulfilled.

In addition, optical discs are now in common use as a storage medium in conjunction with computers. But, again, storage cases for such discs are still relatively primitive.

The present invention addresses the long felt need for an improved, economical, case for storing individual CD, DVD or other discs, and more particularly to a case in which the disc is ejectable from the case. Because no such case can be successful unless it is durable, manufacturable and capable of being used in conjunction with existing packaging operations for CD and DVD mass production, the present invention eschews complexity and boldly discloses a revolutionary new solution that can be assembled from three pieces produced by injection molding that can be snap fit together in conjunction with existing assembly techniques.

SUMMARY OF THE INVENTION

The present invention is generally directed to a disc case for holding a disc with a disc hole in a disc center which is made up of a bottom piece, a top piece, and a movable tray. The bottom has a side wall disc hole through which a disc can be ejected and two bottom grooves located in side walls perpendicular to the side wall with the hole for ejecting the disc. The top is connected to the bottom wall by hinge mechanisms and a tray is held between the top and the bottom. The tray has groove mechanisms for engaging the two bottom grooves as the tray moves between a retracted position in which the disc is located within the three-dimensional disc case and an extended or eject position in which at least a portion of the disc is located outside of the three-dimensional enclosure of the disc case. Movement of the tray is actuated by use of a tray sliding arm handle. The tray has a disc perimeter support for supporting a perimeter of the disc in the tray in the retracted position, a disc locking mechanism for holding the perimeter of the disc in the tray in the retracted position, a center disc rest connected to the disc perimeter support by a center disc rest slant ramp, and a hook with a hook prong that extends upwardly from the center disc rest. The hook prong moves upwardly through the disc hole and engages the disc center to secure the disc center when the tray moves from the extended position to the retracted position but disengages the disc and moves downwardly through the disc hole when the tray moves from the retracted position to the extended position.

In a first, separate group of aspects of the present invention, the side wall of the bottom which contains the hole through which the disc is ejected has one or more downwardly sloping ramps that actuate disengagement of the disc from the hook prong as the tray moves from the retracted position to the extended position. The sloping ramp(s) may be integral with the bottom side wall. Also, the center disc rest slant ramp can have a thicker diameter at its outer lengths relative to the side wall which engage the bottom grooves and taper to a thinner diameter perpendicular to the hook and a downwardly sloping ramp of the bottom side wall may come into contact with the center disc rest slant ramp perpendicular to the hook as the tray moves from the retracted position to the extended position.

In other, separate aspects of the present invention, the bottom groove engagement mechanisms may be comprised of tray rail dowels. The tray can also have a pair of outer rails, as well as a pair of center rails, orientated generally perpendicularly to the side walls with the groove mechanisms for supporting the tray on the bottom base as the tray moves between the retracted and the extended positions.

In still other, separate aspects of the present invention, the disc locking mechanism can utilize multiple disc locking mechanisms such as four leaf spring tabs that snap over an upper top of the perimeter of the disc.

In yet still other, separate aspects of the present invention, the tray can have multiple tray holes within the disc perimeter support to decrease the amount of material required for construction of the tray, and the perimeter support and the center disc rest can have a planar surface area of less than half, or even less than one third, of the planar surface area of the disc.

In a further, separate aspect of the present invention, the bottom, the top and the tray consist of three pieces that can be assembled together to form the disc case by a snap fit.

Accordingly, it is a primary object of the present invention to provide an improved disc case from which a disc can be ejected.

This and further objects and advantages will be apparent to those skilled in the art in connection with the drawings and the detailed description of the preferred embodiment set forth below.

BRIEF DESCRIPTION OF THE DRAWINGS

FIG. 3 is a perspective view illustrating the disc case of the present invention without a disc when the top is partially opened from its bottom.

FIG. 4 is a perspective view illustrating the disc case of the present invention without a disc in an ejected position.

FIG. 5 is a top planar view of a tray of the present invention.

FIGS. 7, 7A, 8 and 8A are cross sectional views taken along the lines shown in FIG. 4, FIGS. 7A and 8A showing the tray of the present invention in an ejected position.

FIG. 9 is a partial sectional view of FIG. 8A.

DETAILED DESCRIPTION OF THE PREFERRED EMBODIMENT

Figure 1:
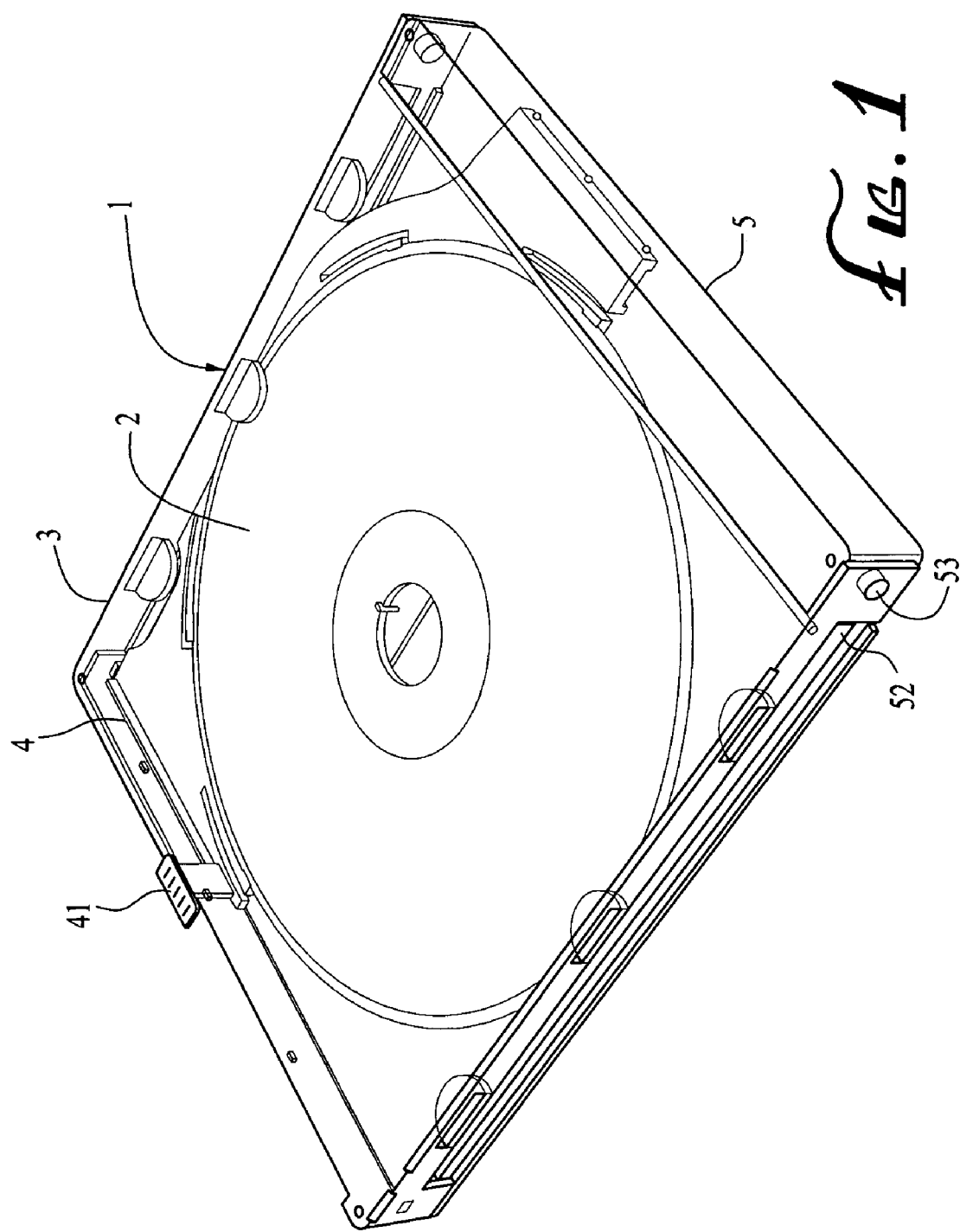
FIG. 1 is a perspective view illustrating the disc case of the present invention having a disc in a closed or retracted position.

A preferred embodiment of the present invention provides a case from which a data storage disc, such as a CD or DVD, can be ejected. In an especially preferred embodiment that is described in the drawings, the case is made from three different components that can be manufactured from injection molds and then automatically assembled together in an automated assembly process in which an insert and disc can be added to the case. Because the present invention can be adapted for use in existing automated assembly processes for CDs and the like, it can readily be adopted for use without expensive changes or modifications to existing automated assembly lines, and no additional costs need be incurred in its packaging. Also, because the cost of the especially preferred embodiment, in large quantities, is actually less than the cost of existing cases, the especially preferred embodiment can offer its advantages of an ejectable case at a price very competitive with existing products, thus ultimately benefiting consumers.

Figure 6:
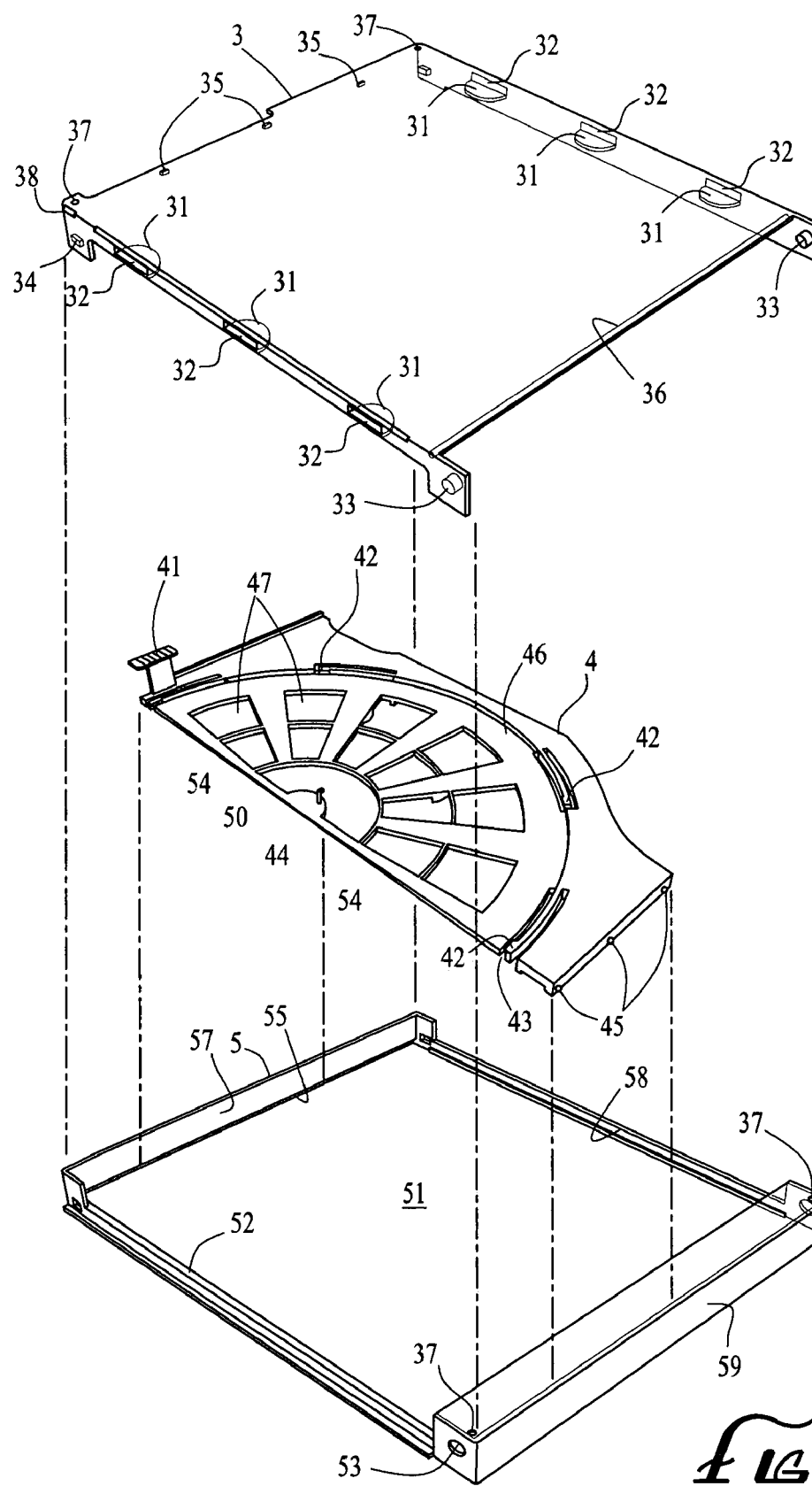
FIG. 6 is an exploded view of a preferred embodiment of the present invention showing how the three pieces of the disc case can be snapped together.

The especially preferred embodiment of the present invention will now be described in connection with FIGS. 1-9. Although FIGS. 1-9 are described in greater detail below, the following is a glossary of the elements identified in the Figures:

1 disc case (generally designated)
2 disc
3 top
4 tray
5 bottom
6 disc center
8 disc hole
31 booklet tab
32 booklet tab hole
33 peg
34 male dimple
35 booklet dimple
36 booklet ridge
37 stacking dimple
38 bull nose corner
41 tray sliding arm handle
42 locking mechanism
43 hole
44 hook
44A hook prong
45 tray rail dowels
46 disc perimeter support
47 tray holes
48 center rails
49 outer rails
50 center disc rest
51 bottom base
52 bottom side wall disc hole
53 peg hole
54 center disc rest slant ramp
55 bottom dowel grooves
56 bottom side wall
57 bottom side wall
58 bottom side wall
59 bottom side wall FIG. 1 depicts a disc case, generally designated 1, holding a disc 2 inside of disc case 1. Disc case 1 is made from three different components—top 3, bottom 5 and tray 4. Each of these three components, even though it will be subsequently described as having numerous parts, can be molded as a single, integral piece via injection molding, and each of the three parts can be assembled by snap fit according to existing assembly processes. Tray 4 is held movably between bottom 5 and top 3. FIG. 6 shows an exploded view of disc case 1 and its three components which can be assembled by snapping tray 4 into bottom 5 and then snapping top 3 into bottom 5 to complete the assembly of disc case 1 (without any booklet or disc).

When tray 4 is snapped into bottom 5 tray rail dowels 45 of tray 4 are snapped into bottom dowel grooves 55 formed in bottom side walls 57 and 59 of bottom 5 (see also FIGS. 8A and 9). Tray rail dowels 45 and bottom dowel grooves 55 function as a guide mechanism for movement of tray 4 and also keep tray 4 held movably in place in relation to bottom 5. It is desirable that tray 4 also have multiple rails to support tray 4 and allow it to glide along bottom base 51 of bottom 5 during movement; two center rails 48 and two outer rails 49 are shown in FIG. 5.

When top 3 is snapped into bottom 5, pegs 33 of top 3 are snapped into peg holes 53 of bottom 5. Once assembled, top 3 can also open or close relative to bottom 5. Top 3 is shown in a partially opened or closed position relative to bottom 5 in FIG. 3.

Top 3 contains booklet tabs 31, booklet tab holes 32, booklet dimples 35 and booklet ridge 36 as is common for current CD cases. A booklet, or even a single sheet (not shown), can be inserted into top 3 and held in place inside of top 3 by booklet tabs 31, booklet dimples 35 and booklet ridge 36, as is currently common in the industry. Because this portion of construction of the especially preferred embodiment is identical to existing CD cases, the same assembly processes used to insert booklets into a CD case can be used with disc case 1 of the present invention. Top 3 also includes a bull nose corner 38 and stacking dimple 37, features which are also common of current CD cases. In addition, male dimples 34 help to keep top 3 in a closed position by mating with corresponding dimples, as is common with current CD cases.

Because tray 4 is movable along bottom 5 relative to bottom side walls 56 (see FIG. 7) and 58 (see FIG. 6), it need not contain as much material as conventional trays. In fact, when other aspects of the design of tray 4 of the especially preferred embodiment are taken into consideration, tray 4 need only have from about approximately ⅝ to approximately ¾ by weight of the amount of material found in conventional CD trays. This represents a significant savings in terms of manufactured cost.

To further decrease the weight, and thus the cost, of tray 4, it is preferred that tray 4 contain tray holes 47. Such tray holes can take on many different shapes, and can, if desired, be optimized for maximum weight reduction. Alternatively, tray holes 47 can be designed from an ornamental standpoint, without regard to maximum functionality of maximum weight reduction, so as to create aesthetic appeal or so as to serve as a vehicle for creating brand recognition. This, in fact, is what has been done in the especially preferred embodiment shown in FIGS. 3-6 in which tray 4 and its tray holes 47 have been patterned so as to create the visual effect of a Greek amphitheater. It should be noted that this design is part of the subject of a design patent application being filed concurrently herewith and, in any event, is considered by itself to be a trademark of the Applicant. Also, as shown in FIG. 4, the portion of the tray that forms the visual effect of a Greek amphitheater can be designed so that it tapers downwardly from its outer portions towards its center, which is center disc rest 50, and center disc rest slant ramp 56, as well as other portions of disc 4, can also have such tapering effect.

Tray 4, which can be made as a single piece from injection molding, maintains disc 2 in place, when tray 4 is in a fully retracted position (shown in FIG. 1), by hook 44, hook prong 44A and locking mechanisms 42. Locking mechanisms 42 engage multiple points of the outside circumferential rim of disc 2 while hook 44 and hook prong 44A engage a point of the rim of disc hole 8, thus providing a sufficiently stable holding mechanism. In the especially preferred embodiment, multiple locking mechanisms 42 are essentially leaf-like springs, movable within holes 43, which include a tab-like edge that hold a portion of the upper outer periphery of disc 2 as shown in FIGS. 7A, 8 and 8A while an outer bottom peripheral portion of disc 2 rests on disc perimeter support 46. When disc 2 is inserted into disc case 1, disc 2 is pushed toward bottom side wall 58 until locking mechanisms 42 snap into place. At the same time, namely when disc 2 is fully inserted into disc case 1 and tray 4 is fully retracted toward bottom side wall 58, hook 44 will have moved from a non-engaged position (shown in FIG. 7A) to an engaged position (shown in FIG. 7) in which tab 44 is located within disc hole 8 located within disc center 6 while hook prong 44A engages the rim of disc 2 that forms the perimeter of disc hole 8.

Figure 2:
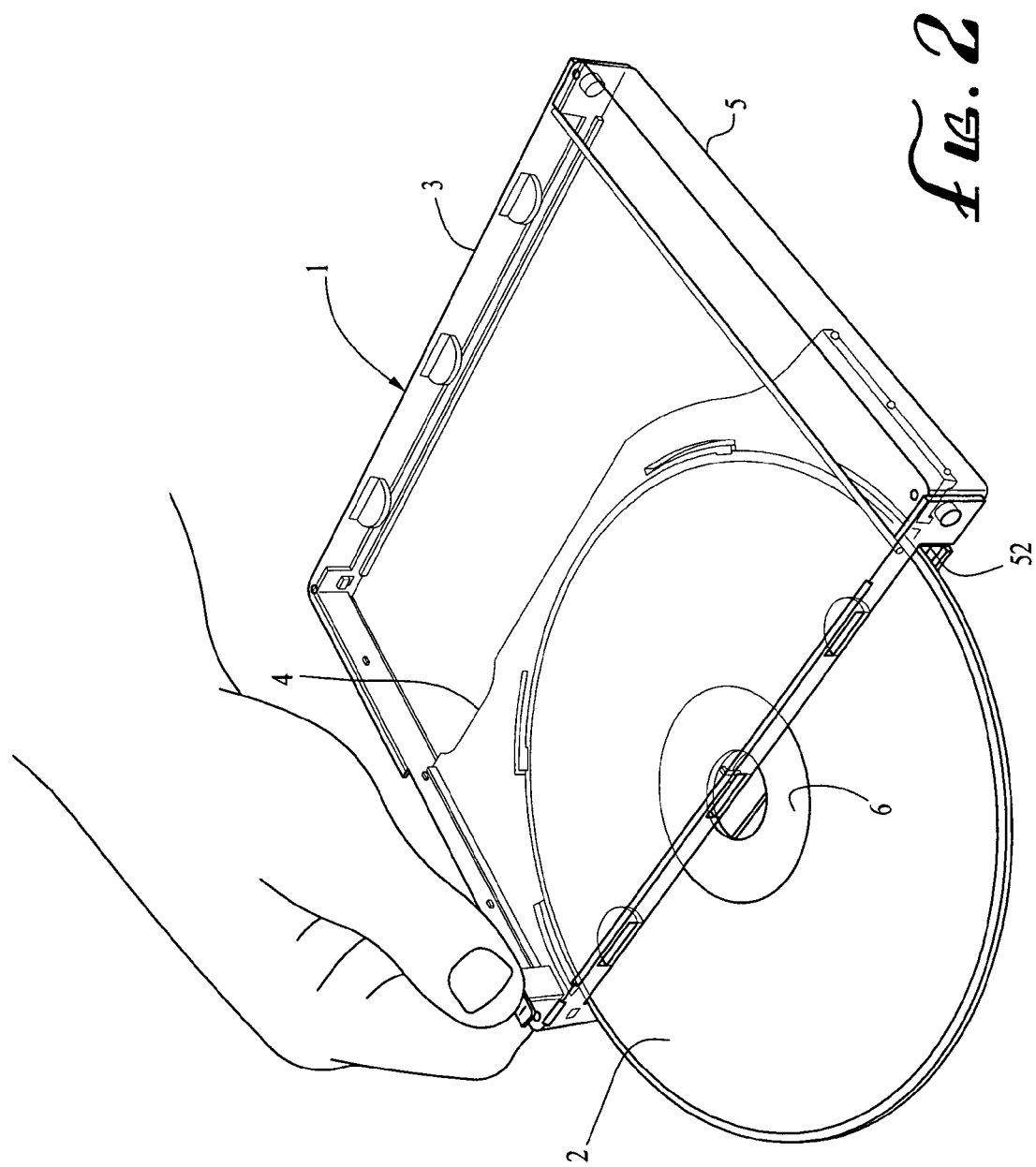
FIG. 2 is a perspective view illustrating the disc case of the present invention having a disc in an ejected position.

Disc 2 is ejected from disc case 1 by forward movement of tray sliding arm handle 41, a motion which can easily be accomplished by a finger of a hand holding disc case 1 so as to allow for a one-handed operation in which disc 2 is ejected from disc case 1. This operation is shown in FIG. 2 in which tray 4 carrying disc 2 has been moved forward by movement of tray sliding arm handle 41 toward bottom side wall 56 (see FIG. 7) so that disc 2 is extended partially outside of disc case 1 through bottom side wall disc hole 52.

Hook 44 rests on center disc rest 50 of tray 4. As disc 2 is ejected from disc case 1, tray 4 moves toward bottom side wall 56 which, in the especially preferred embodiment, has a downwardly slanting interior side wall shown in FIGS. 7 and 7A. While it is convenient to have the interior side of bottom side wall 58 slant downwardly all along its point of contact(s) with tray 4, it need not do so, and the interior of bottom side wall 58 could, alternatively, have multiple slanting walls to engage disc slant ramp 54 at multiple points of contact. When center disc slant ramp 54 comes into contact with the downwardly slanting interior of bottom side wall 56, it moves downwardly relative to bottom base 51, thus pulling hook 44 toward bottom base 51 as tray 4 is bent by the motion, and, after hook prong 44A has disengaged its contact with the rim of disc hole 8, ultimately pulling hook 44 out of disc hole 8 to disengage hook 44 from disc 2 by the time tray 4 reaches its eject position shown in FIGS. 2, 7A and 8A. As disc 2 is removed from disc case 1 in the eject position, locking mechanisms 42 will disengage disc 2.

As can be appreciated from the foregoing description, the present invention provides a mechanism for holding a disc securely in a slidable tray that can be actuated through simple movement of a finger of a hand holding the disc case. Moreover, because of the three piece construction of the present invention, all of the interaction necessary to accomplish such function is obtainable from three parts that can be manufactured by injection molded and then automatically assembled by snap fit without the need of complicated assembly methods. This, then, represents a truly revolutionary advance disclosed herein.

While the invention has been described herein with reference to certain preferred embodiments, those embodiments have been presented by way of example only, and not to limit the scope of the invention. Additional embodiments thereof will be obvious to those skilled in the art having the benefit of this detailed description. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A disc case for holding a disc with a disc hole in a disc center, comprising:

a bottom having a bottom base and a first, a second, a third and a fourth bottom side wall extending generally perpendicularly in an upward direction from the bottom base to form a four-sided side wall structure for the bottom, the second and the fourth bottom side walls being connected to the first and the third bottom side walls, said bottom further comprising:

a bottom side wall disc hole located in the first bottom side wall;

a first bottom groove located in the second bottom side wall;

a second bottom groove located in the fourth bottom side wall;

a top connected to the bottom to form a three-dimensional enclosure for the disc wherein the disc can be removed from the disc case through the bottom side wall disc hold; and a tray for holding the disc in the disc case between the bottom and the top, said tray further comprising:

a first bottom groove engagement mechanism for engaging the first bottom groove during movement of the tray between a retracted position wherein the disc is located within the three-dimensional enclosure and an extended position in which at least a portion of the disc is located outside of the three-dimensional enclosure, the portion of the disc that moves between inside and outside of the three-dimensional enclosure moving through the bottom side wall disc hole;

a second bottom groove engagement mechanism for engaging the second bottom groove during movement of the tray between the retracted position and the extended position;

a tray sliding arm handle for actuating movement of the tray between the retracted position and the extended position;

a disc perimeter support for supporting a perimeter of the disc in the tray in the retracted position;

a disc locking mechanism for holding the perimeter of the disc in the tray in the retracted position;

a center disc rest connected to the disc perimeter support by a center disc rest slant ramp; and a hook with a hook prong that extends upwardly from the center disc rest;

wherein the hook prong moves upwardly through the disc hole and engages the disc center to secure the disc center when the tray moves from the extended position to the retracted position but disengages the disc and moves downwardly through the disc hole when the tray moves from the retracted position to the extended position.

2. The disc case as recited in claim 1, wherein the bottom is further comprised of a downwardly sloping ramp located at the first bottom side wall that actuates disengagement of the disc from the hook prong as the tray moves from the retracted position to the extended position.

3. The disc case as recited in claim 2, wherein the downwardly sloping ramp is integral with the first bottom side wall.

4. The disc case as recited in claim 2, wherein the center disc rest slant ramp has a thicker diameter at its outer lengths relative to the second and fourth bottom side walls and tapers to a thinner diameter perpendicular to the hook.

5. The disc case as recited in claim 2, wherein the downwardly sloping ramp comes into contact with the center disc rest slant ramp perpendicular to the hook as the tray moves from the retracted position to the extended position.

6. The disc case as recited in claim 4, wherein the downwardly sloping ramp comes into contact with the center disc rest slant ramp having a diameter that is thinner than the thicker diameter as the tray moves from the retracted position to the extended position.

7. The disc case as recited in claim 1, wherein the first and the second bottom groove engagement mechanisms are comprised of a plurality of tray rail dowels.

8. The disc case as recited in claim 1, wherein the disc locking mechanism is comprised of a plurality of disc locking mechanisms.

9. The disc case as recited in claim 8, wherein the plurality of disc locking mechanisms is comprised of four leaf spring tabs that snap over an upper top of the perimeter of the disc.

10. The disc case as recited in claim 1, wherein the tray has a plurality of tray holes within the disc perimeter support to decrease the amount of material required for construction of the tray.

11. This disc case as recited in claim 10, wherein the perimeter support and the center disc rest have a planar surface area of less than fifty percent of the planar surface area of the disc.

12. This disc case as recited in claim 10, wherein the perimeter support and the center disc rest have a planar surface area of less than one third of the planar surface area of the disc.

13. The disc case as recited in claim 1, wherein the tray is further comprised of:
a pair of outer rails orientated generally perpendicularly to the first bottom side wall for supporting the tray on the bottom base as the tray moves between the retracted and the extended positions.

14. The disc case as recited in claim 1, wherein the tray is further comprised of:
a pair of center rails orientated generally perpendicularly to the first bottom side wall for supporting the tray on the bottom base as the tray moves between the retracted and the extended positions.

15. The disc case as recited in claim 1, wherein the bottom, the top and the tray consist of three pieces.

16. The disc case as recited in claim 15, wherein the three pieces are assembled together to form the disc case by a snap fit.

17. A disc case for holding a disc with a disc hole in a disc center, comprising:
a bottom having a bottom base and a first, a second, a third and a fourth bottom side wall extending generally perpendicularly in an upward direction from the bottom base to form a four-sided side wall structure for the bottom, the second and the fourth bottom side walls being connected to the first and the third bottom side walls, said bottom further comprising:
a bottom side wall disc hole located in the first bottom side wall;
a first bottom groove located in the second bottom side wall;
a second bottom groove located in the fourth bottom side wall; and
a downwardly sloping ramp integral with the first bottom side wall;

a top connected to the bottom to form a three-dimensional enclosure for the disc wherein the disc can be removed from the disc case through the bottom side wall disc hold; and a tray for holding the disc in the disc case between the bottom and the top, said tray further comprising:
a first bottom groove engagement mechanism for engaging the first bottom groove during movement of the tray between a retracted position wherein the disc is located within the three-dimensional enclosure and an extended position in which at least a portion of the disc is located outside of the three-dimensional enclosure, the portion of the disc that moves between inside and outside of the three-dimensional enclosure moving through the bottom side wall disc hole;

a second bottom groove engagement mechanism for engaging the second bottom groove during movement of the tray between the retracted position and the extended position;

a tray sliding arm handle for actuating movement of the tray between the retracted position and the extended position;

a disc perimeter support for supporting a perimeter of the disc in the tray in the retracted position;

a disc locking mechanism for holding the perimeter of the disc in the tray in the retracted position;

a center disc rest connected to the disc perimeter support by a center disc rest slant ramp; and a hook with a hook prong that extends upwardly from the center disc rest;

wherein the hook prong moves upwardly through the disc hole and engages the disc center to secure the disc center when the tray moves from the extended position to the retracted position but disengages the disc and moves downwardly through the disc hole when the tray moves from the retracted position to the extended position;

wherein the downwardly sloping ramp actuates disengagement of the disc from the hook prong as the tray moves from the retracted position to the extended position; and wherein the bottom, the top and the tray consist of three pieces that can be assembled together to form the disc case by a snap fit.

18. The disc case as recited in claim 17, wherein the center disc rest slant ramp has a thicker diameter at its outer lengths relative to the second and fourth bottom side walls and tapers to a minimum diameter proximate to the hook.

19. The disc case as recited in claim 18, wherein the first and the second bottom groove engagement mechanisms are comprised of a plurality of tray rail dowels and the disc locking mechanism is comprised of a plurality of disc locking mechanisms.

20. The disc case as recited in claim 18, wherein the tray has a plurality of tray holes within the disc perimeter support to decrease the amount of material required for construction of the tray and the perimeter support and the center disc rest have a planar surface area of less than fifty percent of the planar surface area of the disc.

21. The disc case as recited in claim 20, wherein the tray is further comprised of:
   a pair of outer rails orientated generally perpendicularly to the first bottom side wall for supporting the tray on the bottom base as the tray moves between the retracted and the extended positions.

22. The disc case as recited in claim 21, wherein the tray is further comprised of:
   a pair of center rails orientated generally perpendicularly to the first bottom side wall for supporting the tray on the bottom base as the tray moves between the retracted and the extended positions.

* * * * *